(12) United States Patent
Schuster et al.

(10) Patent No.: US 6,557,488 B1
(45) Date of Patent: May 6, 2003

(54) TEATCUP FOR MILKING COWS OR OTHER ANIMALS

(75) Inventors: Anders Schuster, Horby (SE); Nils-Erik Holmertz, Huddinge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/786,463

(22) PCT Filed: Sep. 3, 1999

(86) PCT No.: PCT/SE99/01524

§ 371 (c)(1),
(2), (4) Date: Mar. 5, 2001

(87) PCT Pub. No.: WO00/13494

PCT Pub. Date: Mar. 16, 2000

(30) Foreign Application Priority Data

Sep. 4, 1998 (SE) ............................................. 9803013

(51) Int. Cl.[7] ................................................. A01J 5/04
(52) U.S. Cl. ..................................................... 119/14.49
(58) Field of Search ........................... 119/14.49, 14.47, 119/14.38, 14.54, 14.53

(56) References Cited

U.S. PATENT DOCUMENTS

| 4,483,272 A | * | 11/1984 | Tonelli ..................... 119/14.32 |
| 5,291,853 A | | 3/1994 | Steingraber et al. |
| 6,058,879 A | * | 5/2000 | Miefalk ................... 119/14.47 |
| 6,142,098 A | * | 11/2000 | van den Berg .......... 119/14.51 |
| 6,167,838 B1 | * | 1/2001 | van den Berg .......... 119/14.02 |
| 6,276,297 B1 | * | 8/2001 | van den Berg et al. ... 119/14.01 |

FOREIGN PATENT DOCUMENTS

| EP | 0 088 580 | 9/1983 | |
| EP | 0 385 539 | 9/1990 | |
| EP | 0945056 A2 | * 9/1999 | ............ A01J/5/08 |
| WO | WO 97/35469 | 10/1997 | |

* cited by examiner

Primary Examiner—Peter M. Poon
Assistant Examiner—Son T Nguyen
(74) Attorney, Agent, or Firm—Young & Thompson

(57) ABSTRACT

The teatcup includes a teat inlet end and a milk discharge end, a liner insertable within and supported by the teatcup and having a teat inlet opening at the teat inlet end of the teatcup, characterized by a milk chamber within the milk discharge end of the teatcup, a milk discharge tube extending sideways through a side wall portion of the chamber and being adapted for discharging milk from the chamber via a suction tube arranged in the chamber and having a milk inlet opening adjacent to a bottom surface in the chamber.

20 Claims, 3 Drawing Sheets

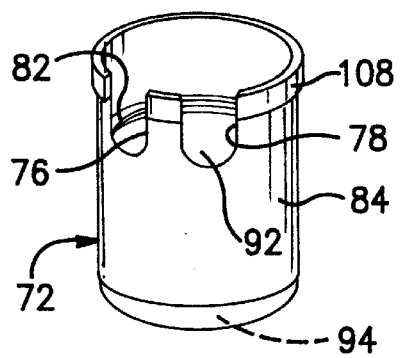
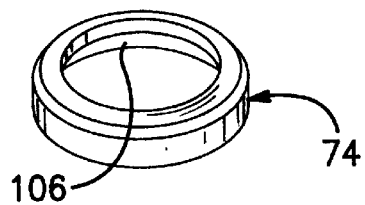
FIG. 6
FIG. 7
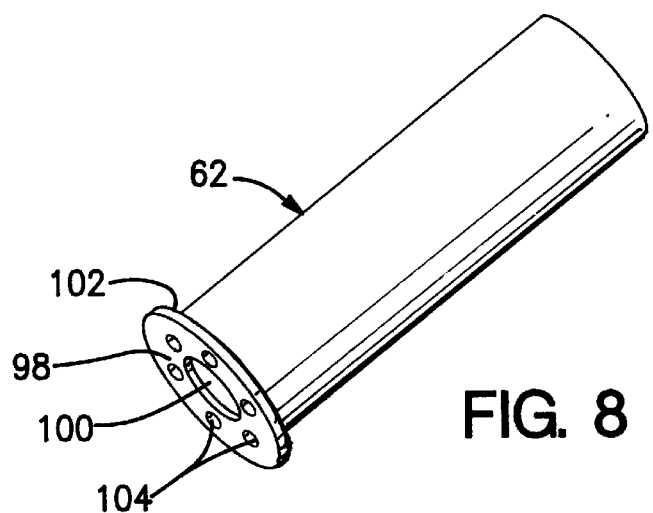
FIG. 8
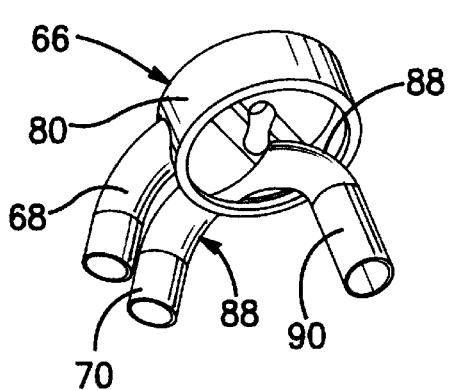
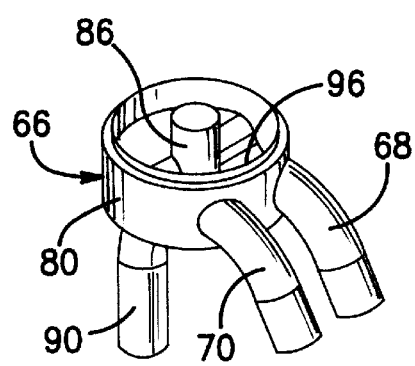
FIG. 9A
FIG. 9B

TEATCUP FOR MILKING COWS OR OTHER ANIMALS

TECHNICAL FIELD OF THE INVENTION

The present invention relates to a teatcup having a teat inlet end and a milk discharge end. A liner, which is insertable within the teatcup and supported by same, has a teat inlet opening at the teatcup's inlet end. The teatcup may be used for quarter milking, preferably in connection with an automatic milking system. The teatcup is adapted to be individually connected to a teat of the udder by a milking robot of such automatic milking system.

BACKGROUND OF THE INVENTION

In EP-0 385 539 there is described a milking plant comprising teatcups. Each teatcup has a separate line for conveying the milk obtained from the respective udder quarter teat to a milk measuring device which includes four milk meters. The teatcup comprises a metal sleeve enclosing an inner rubber wall. A rubber cap seals the space between the sleeve and inner wall at the teatcup's upper end. In the lower part of the teatcup there is provided a buffer space. At the bottom of this buffer space there is connected a milk discharge line. Furthermore, the buffer space contains a fixed element adapted to ensure a gradually flow of milk into the buffer space. At the upper end of said element there is provided a sensor for performing a temperature measurement.

To sum up, this prior art teatcup constitutes a rather complicated construction having a considerable axial length which, together with the fact that the milk discharge line leaves the teatcup at a point very close to the bottom end thereof, implies that the connection and disconnection of the teatcup to/from the teat will require a considerable space in the region below the udder and teats of the animal being milked. This makes the possibilities of using such teatcup construction rather limited, especially in connection with automatic milking using a milking robot.

OBJECTS OF THE INVENTION

The primary object of the invention is to provide a teatcup which is so designed that it can be used—without encountering space problems—for milking an animal having an udder which hangs down deeply, so that the teats thereof are at a low height above the floor-surface on which the animal is standing. In this connection it should be remembered that not only the teatcup itself, but also the flexible tubing connected thereto, will require a certain free vertical space between the udder/teats and the floor-surface to guarantee that the teatcup and its tubing will not touch said floor-surface when the teatcup is being connected to, or disconnected from, a teat.

Another object of the invention is to provide a teatcup designed to avoid the emergence of FFA-related milk flow problems, especially in connection with quarter milking.

Furthermore, the invention seeks to provide a straightforward teatcup construction which is reliable to use and impedes vacuum fluctuations, is durable, is inexpensive to manufacture, has a low weight, and can be made as a unitary component.

SUMMARY OF THE INVENTION

According to the present invention the above-mentioned objects are obtained by a teatcup of the type defined above and characterized by a milk chamber within the milk discharge end of the teatcup, a milk discharge tube extending sideways through a side wall portion of the chamber and being adapted for discharging milk from the chamber via a suction tube means arranged in the chamber and having a milk inlet opening adjacent to a bottom surface in the chamber.

Hereby is achieved that the teatcup can be used for quarter milking where a conventional cluster (comprising a milk claw and four teatcup-liners directly attached thereto) is not used, for which reason each teatcup must have its own milk chamber for temporary storage of the milk from the liner's milk discharge end. Furthermore, by having a sideways extending milk discharge tube, which is arranged at some axial distance from the bottom end of the milk chamber, it is possible to avoid contact between the milk hose or piping attached to the milk discharge end of said tube, and the floor-surface below the teatcup's bottom end.

Within the milk chamber and in the region of the milk inlet opening of the suction tube means there is preferably arranged a smooth milk flow generator.

This flow generator may suitably comprise a central flow direction control protrusion or formation, preferably in the form of a convex or conical boss, on the bottom surface in the milk chamber, which protrusion/formation is situated opposite to the inlet opening of the suction tube means.

Thanks to this milk flow generator, FFA-related milk flow problems can be effectively avoided (FFA=Free Fatty Acids).

To allow pressure variations to be impeded, the milk chamber within the milk discharge end of the teatcup preferably should have an extra volume of about 80 ml or more.

The milk discharge tube suitably extends transversely to the side wall of the teatcup, and a milk chamber end of said tube is attached to a milk outlet portion of the suction tube means.

Since said outlet portion of the suction tube means will be situated at a certain distance above the bottom of the milk chamber, the milk discharge tube will also be located at a certain distance above the teatcup's bottom end, and this helps to keep the milk hose or piping, extending from the tube, away from contact with the underlying floor-surface.

Preferably, the suction tube means is a bell-shaped member, the circumferential free edge portion of which defines the milk inlet opening thereof, and the interior of the bell-shaped member communicates with the interior of the milk discharge tube, the open milk chamber inlet end of which is situated within the milk outlet portion of the bell-shaped member.

Hereby is achieved that a smooth milk flow is secured within the milk chamber, from the bottom region thereof into the milk discharge tube.

In order to further ensure a controlled milk flow from the bottom region of the chamber to the interior of the suction tube means, the suction tube means is preferably provided at the inlet opening thereof with protrusions extending towards the milk chamber bottom surface and being positioned circumferentially to the central flow direction control protrusion.

From a manufacturing point of view the teatcup suitably comprises a milk discharge housing containing the milk chamber and being disengageably connected with the milk discharge end of the teatcup.

The milk discharge housing preferably is a can-shaped receptacle being coaxial with the teatcup center line and having a cylindrical side wall attached to the outside of the teatcup.

Generally, the teatcup may suitably comprise a cylindrical shell having a first end and a second end, and the liner, which is insertable within and supported by the shell, may then have its teat inlet opening end connected to the shell's first end, and a milk discharge end comnunicating with the shell's second end, or alternatively attached or connected to said second end.

The milk chamber may be housed within a milk discharge housing, which is disengageably connected with the shell's second end, or which constitutes an integral part of the shell at the second end thereof.

According to the present invention, in another embodiment thereof, the suction tube means and the milk discharge tube constitute consecutive sections or portions of one and the same milk discharge tube unit extending from the region of the milk chamber bottom surface through the chamber side wall to the outside thereof.

With this embodiment it is achieved that the manufacture of the teatcup will be simple thanks to the uncomplicated design of its major parts, and furthermore the cleaning of the teatcup will be easy to accomplish.

Preferably, the milk discharge tube unit shows a smoothly curved configuration between the milk inlet opening end and the outlet end thereof. Thereby FFA-related problems are avoided.

Suitably, the milk discharge housing comprises an intermediate, ring-shaped adapter means connected with the milk discharge end of the teatcup, and a can-shaped receptacle connected with the adapter means and being disengageably attached to the outside of the teatcup, and the milk discharge tube unit extends through a side wall portion of said adapter means.

To simplify the assembling and disassembling of the teatcup, it is preferable that the can-shaped receptacle is attachable to the teatcup by means of a manually controllable locking means co-operating on one hand with engagement means on the outside of a wall portion of the receptacle, and on the other hand with engagement means on the outside of the teatcup.

DESCRIPTION OF THE DRAWINGS

The invention will now be further elucidated by means of the following description of preferred embodiments shown on the enclosed drawing, wherein:

FIG. 6, FIG. 7 and FIG. 8 show the can-shaped receptacle, the lock ring and the cylindrical shell of the teatcup shown in FIGS. 4–5; and FIG. 9a and FIG. 9b show different perspective views of the adapter means shown in FIG. 5.

DETAILED DESCRIPTION OF EMBODIMENTS

Figure 3:
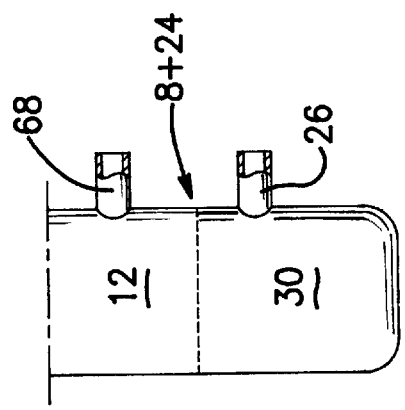
FIG. 3 is a side view, similar to the one shown in FIG. 2, of another teatcup having its milk chamber within a housing constituting an integral part of the teatcup's shell.
Figure 2:
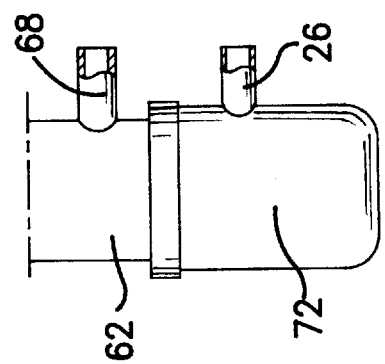
FIG. 2 is a side view of a teatcup having its milk chamber housed within a milk discharge housing disengageably connected to the lower portion of the teatcup's shell.
Figure 1:
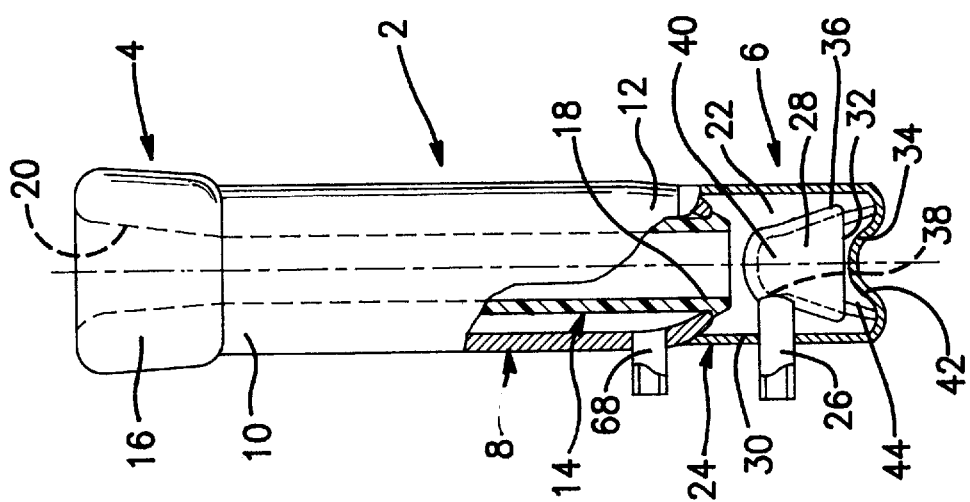
FIG. 1 is a side view, partly in axial section, of a first embodiment of a teatcup according to the invention.

FIG. 1 shows, partly in vertical section, a first embodiment of a teatcup 2 in its normal vertical position of uses, i.e. with its teat inlet end 4 at the top and its milk discharge end 6 at the bottom. The teatcup 2 comprises a cylindrical shell 8 having a first, upper end 10 and a second, lower end 12.

A liner 14, which is insertable within and supported by the shell 8, has a teat inlet opening end 16 supported by the upper end 10 of the shell 8, and a milk discharge end 18 positioned within the teatcup and in contact with the lower end 12 of the shell 8. In the inlet opening end 16 of the liner 14 there is provided an inlet opening 20 for the insertion of a teat onto which the teatcup is to be applied. Within the milk discharge end 6 of the teatcup 2, i.e. in the region directly below the liner's 14 milk discharge end 18, there is provided a milk chamber 22 housed within a milk discharge charge housing 24, which may be disengageably connected with the shell's 8 lower end 12 or, alternatively, may be shaped as an integral part or continuation of the shell 8 at the lower end 12 thereof.

A milk discharge tube 26, which is adapted for discharging milk from the chamber 22 via a bell-shaped center suction tube means 28, extends sideways through and transversely to the side wall 30 of the teatcup's milk discharge housing 24. The suction tube means 28, which is centrally situated in the chamber 22, has a large milk inlet opening 32 adjacent to a bottom surface 34 in the chamber.

The milk chamber 22 has been given an extra large volume, compared to what would have been required for merely collecting the milk to be discharged via the milk discharge tube 26. The purpose of this enlarged chamber volume is to avoid vacuum fluctuations which would otherwise run the risk of arising in connection with individual quarter milking. Thus, the extra large milk chamber volume allows pressure variations to be impeded.

The bell-shaped suction tube means 28 has a circumferential free edge portion 36 at the bottom thereof. This edge portion defines the milk inlet opening 32 of the tube means 28. The milk discharge tube 26 has an open inlet end 38 situated within the upper milk outlet portion 40 of the suction tube means 28. The interior of the bell-shaped suction tube means communicates with the interior of the milk discharge tube 26 via the open inlet end 38 thereof.

Within the milk chamber 22, on the bottom surface 34 thereof, there is provided a smooth milk flow generator 42 located opposite to the milk inlet opening 32 of the center suction tube means 28. This flow generator 42 comprises a central upwardly convex or conical protrusion or formation adapted to provide a smooth direction control of the milk flow entering into the bell-shaped means 28 through the inlet opening 32.

Furthermore, in order to help creating a controlled milk flow from the bottom region of the milk chamber 22 to the interior of the bell-shaped suction tube means 28, there are provided three or more circumferentially spaced protrusions 44 along the free edge portion 36 of said tube means 28. These protrusions 44, which are pointing downwards towards the milk chamber's 22 bottom surface 34, also constitute points of support for said edge portion on said bottom surface. Since these protrusions 44 are positioned on the edge portion 36, they are thereby positioned circumferentially to the central flow direction control protrusion or generator 42 on the bottom surface 34 in the milk chamber 22.

Figure 4:
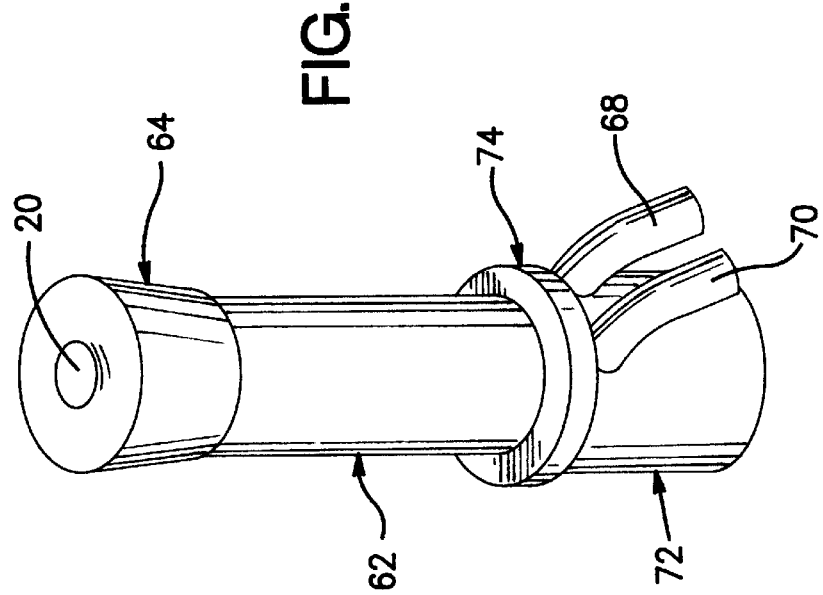
FIG. 4 is a perspective side view of a second embodiment of a teatcup according to the invention.
Figure 5:
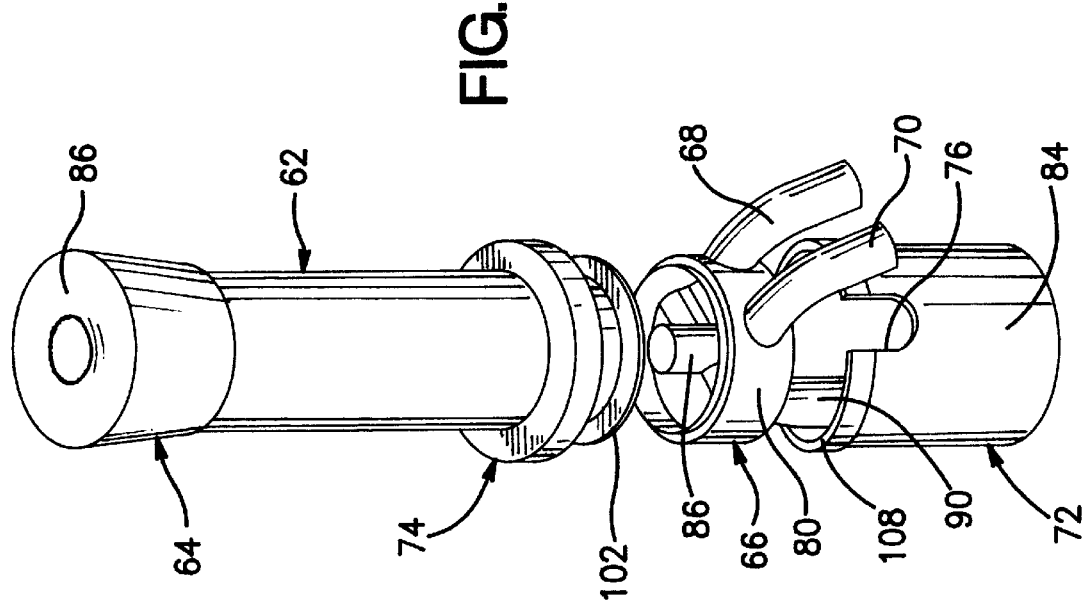
FIG. 5 is an axially "exploded" view of the teatcup shown in FIG. 4.

FIGS. 4 and 5 show, in an assembled state and in an "exploded" state, respectively, a second embodiment of a teatcup according to the invention. As is particularly clear from FIG. 5, the teatcup comprises four major parts, namely:

a cylindrical shell 62 supporting a liner 64 inserted therein;

s ring-shaped adapter means 66 provided with a vacuum tube 68 and a milk discharge tube 70;

a can-shaped receptacle 72 adapted to receive in the upper part thereof said adapter means 66; and a lock ring 74 positioned around said shell 62 and adapted to axially fasten together said major parts.

As is visible in FIG. 6, the can-shaped receptacle 72 is provided with a pair of U-shaped notches 76 and 78 in the upper part of the side wall of the receptacle. These notches make room for the tubes 68,70 protruding from the ring-shaped wall 80 of the adapter means 66, when said means is positioned in the upper part of the receptacle 72 so that the ring-shaped underside or bottom surface of the wall 80 rests on a supporting ring-shaped faying surface 82 on the inner side of the wall 84 of the receptacle.

As is clearly seen in FIGS. 5 and 9b, the adapter means 66 is also provided, at the center thereof, with an axially directed milk outlet pipe 86 adapted to conduct milk from the milk discharge end of the liner within the cylindrical shell 62. In FIGS. 4 and 5, only the teat inlet end portion 86 of said liner is visible.

FIG. 9a clearly shows that the milk discharge tube 70 visible on the outside of the adapter means 66 is the exterior part of a U-shaped milk discharge tube unit 88, the interior part 90 of which constitutes a suction tube means extending downwards from the adapter means 66 into a milk chamber 92 within the receptacle 72, which together with the adapter means 66 constitute a milk discharge housing. In the receptacle 72 the suction tube means part 90 extends axially down to the region of the bottom surface 94 in the milk chamber 92.

The U-shaped milk discharge tube unit 88, which consists of the tube parts 70 and 90, shows a smoothly curved configuration between its ends to avoid any FFA-related milk flow problems. The vacuum tube 68 extends through the wall 80 of the adapter means 66 and has its mouth on the inside of the wall 80 in the space above a horizontal partition wall 96 which divides the interior of the adapter means 66 into said space above the wall 96 and a space below same. The tube unit 88 extends fluid-tight through the partition wall 96.

FIG. 8 shows the shell 62 which is provided, at the bottom end thereof, with an end wall 98 having a central opening 100. The ring-shaped wall portion between the circumference of the end wall 98 and the outside of the shell 62 constitutes an outer flange 102, and the opening 100 defines an inner flange provided with holes 104 for conveying the vacuum to the space between the inside of shell 62 and outside of the liner (not visible) inserted within the shell. The bottom or milk discharge end of the liner 64 is fluid-tightly inserted between the outside of the milk outlet pipe 86 and the inner edge of the inner flange of the end wall 98.

FIG. 7 shows the lock ring 74 which is provided with an internal thread on the inside 106 thereof, and the wall 84 of the receptacle is provided with a mating external thread on the outside of a rim 108 at the top end of the receptacle.

Thus, when the adapter means 66 has been properly positioned in the upper part of the receptacle, the internal thread of the lock ring 74 can be brought into engagement with the external thread on the rim 108 and tightened thereby axially locking together the parts 62, 66 and 72 which together make up the teatcup.

What is claimed is:

1. A teatcup comprising:
a teat inlet end;
a milk discharge end;
a liner insertable within and supported by the teatcup and having a teat inlet opening at the teat inlet end of the teatcup;
a milk chamber located within the milk discharge end of the teatcup and downstream of the discharge end of the liner;
a milk discharge tube extending, at a place axially spaced from the milk chamber bottom end, sideways through a side wall portion of the chamber and being adapted for discharging milk from the chamber, the milk discharge tube connected to a suction tube means positioned within the chamber and having a milk inlet opening directed downward towards a bottom surface in the chamber and being adjacent to the bottom surface such that said milk inlet opening suctions milk upwards through said milk inlet opening;
a smooth milk flow generator arranged within the milk chamber in the region of the milk inlet opening of the suction tube means; and
wherein the milk chamber has an extra volume effective to impede pressure variations.

2. The teatcup according to claim 1, wherein the smooth milk flow generator comprises a central flow direction control protrusion or formation on the bottom surface in the milk chamber, which protrusion/formation is situated opposite to the inlet opening of the suction tube means.

3. The teatcup according to claim 1, further comprising a milk discharge housing containing the milk chamber and being disengageably connected with the milk discharge end of the teatcup and wherein the extra volume comprises at least 80 ml.

4. The teatcup according to claim 3, wherein the suction tube means and the milk discharge tube constitute consecutive sections or portions of one and the same milk discharge tube unit extending from the region of the milk chamber bottom surface through the chamber side wall to the outside thereof.

5. The teatcup according to claim 4, wherein the milk discharge tube unit has a smoothly curved configuration between the milk inlet opening end and the outlet end thereof.

6. The teatcup according to claim 4, wherein the milk discharge housing comprises an intermediate, ring-shaped adapter means connected with the milk discharge end of the teatcup, and a can-shaped receptacle connected with the adapter means and being disengageably attached to the outside of the teatcup.

7. The teatcup according to claim 6, wherein the milk discharge tube unit extends through a side wall portion of the adapter means.

8. The teatcup according to claim 6, wherein the can-shaped receptacle is attachable to the teatcup by means of a manually controllable locking means co-operating on one hand with engagement means on the outside of a wall portion of the receptacle, and on the other hand with engagement means on the outside of the teatcup.

9. The teatcup according to claim 3, wherein the milk discharge housing is a can-shaped receptacle being coaxial with the teatcup centerline and having a cylindrical side wall attached to the outside of the teatcup.

10. The teatcup according to claim 1, further comprising a cylindrical shell having a first end and a second end, the liner, which is insertable within and supported by the shell, having its teat inlet opening end connected to the shell's first end and a milk discharge end communicating with the shell's second end.

11. The teatcup according to claim 10, wherein the milk chamber is housed within a milk discharge housing, which is disengageably connected with the shell's second end.

12. The teatcup according to claim 10, wherein the milk chamber is housed within a milk discharge housing being shaped as an integral part of the shell at the second end thereof.

13. The teatcup according to claim 1, wherein the milk discharge tube extends transversely to the side wall of the teatcup, a milk chamber end of the tube being attached to a milk outlet portion of the suction tube means.

14. The teatcup according to claim 13, wherein the suction tube means is a bell-shaped member the circumferential free edge portion of which defines the milk inlet opening thereof, and the interior of the bell-shaped member communicates with the interior of the milk discharge tube, the open milk chamber inlet end of which is situated within the milk outlet portion of the bell-shaped member.

15. A teatcup comprising:

a teat inlet end;

a milk discharge end;

a liner insertable within and supported by the teatcup and having a teat inlet opening at the teat inlet end of the teatcup;

a milk chamber located within the milk discharge end of the teatcup and downstream of the discharge end of the liner;

a milk discharge tube extending, at a place axially spaced from the milk chamber bottom end, sideways through a side wall portion of the chamber and being adapted for discharging milk from the chamber via a suction tube means arranged in the chamber and having a milk inlet opening directed towards a bottom surface in the chamber and being adjacent to the bottom surface;

a smooth milk flow generator arranged within the milk chamber in the region of the milk inlet opening of the suction tube means;

wherein the smooth milk flow generator comprises a central flow direction control protrusion or formation on the bottom surface in the milk chamber, which protrusion/formation is situated opposite to the inlet opening of the suction tube means; and the suction tube means is provided at the inlet opening thereof with protrusions extending towards the milk chamber bottom surface and being positioned circumferentially to the central flow direction control protrusion for creating a controlled milk flow from the bottom region of the chamber to the interior of the suction tube means.

16. A teatcup comprising:

a teat inlet end;

a milk discharge end;

a liner insertable within and supported by the teatcup and having a teat inlet opening at the teat inlet end of the teatcup;

a milk chamber located within the milk discharge end of the teatcup and downstream of the discharge end of the liner;

a milk discharge tube extending, at a place axially spaced from the milk chamber bottom end, sideways through a side wall portion of the chamber and being adapted for discharging milk from the chamber, the milk discharge tube connected to a suction tube means positioned within the chamber and having a milk inlet opening directed downward towards a bottom surface in the chamber and being adjacent to the bottom surface such that said milk inlet opening suctions milk upwards through said milk inlet opening;

a milk discharge housing containing the milk chamber and being disengageably connected with the milk discharge end of the teatcup; and wherein the suction tube means and the milk discharge tube constitute consecutive sections or portions of one and the same milk discharge tube unit extending from the region of the milk chamber bottom surface through the chamber side wall to the outside thereof.

17. The teatcup according to claim 16, wherein the milk discharge tube unit has a smoothly curved configuration between the milk inlet opening end and the outlet end thereof.

18. The teatcup according to claim 16, wherein the milk discharge housing comprises an intermediate, ring-shaped adapter means connected with the milk discharge end of the teatcup, and a can-shaped receptacle connected with the adapter means and being disengageably attached to the outside of the teatcup.

19. The teatcup according to claim 18, wherein the milk discharge tube unit extends through a side wall portion of the adapter means.

20. The teatcup according to claim 18, wherein the can-shaped receptacle is attachable to the teatcup by means of a manually controllable locking means co-operating on one hand with engagement means on the outside of a wall portion of the receptacle, and on the other hand with engagement means on the outside of the teatcup.

* * * * *